United States Patent [19]
Fanta et al.

[11] 3,976,552
[45] Aug. 24, 1976

[54] WATER-SOLUBLE GRAFT POLYMERS PRODUCED BY AN OUTWARDLY DRY RADIATION POLYMERIZATION PROCESS

[75] Inventors: George F. Fanta; Robert C. Burr, both of Peoria, Ill.

[73] Assignee: The United States of America as represented by the Secretary of Agriculture, Washington, D.C.

[22] Filed: Aug. 13, 1975

[21] Appl. No.: 604,362

[52] U.S. Cl. .................. 204/159.12; 260/17.4 ST
[51] Int. Cl.$^2$ ...................... C08L 1/00; C08L 3/00
[58] Field of Search ................... 260/17.4 ST; 204/159.12

[56] References Cited
UNITED STATES PATENTS

| | | | |
|---|---|---|---|
| 3,461,052 | 8/1969 | Restaino et al. | 204/159.12 |
| 3,518,176 | 6/1970 | Reyes et al. | 204/159.12 |
| 3,561,933 | 2/1971 | Restaino et al. | 23/312 |
| 3,635,857 | 1/1972 | Restaino et al. | 260/17.4 |

Primary Examiner—Richard B. Turer
Attorney, Agent, or Firm—M. Howard Silverstein; David G. McConnell

[57] ABSTRACT

A method was discovered of graft polymerizing water-soluble monomers with starch under conditions which are outwardly dry appearing. Conversion of monomer to polymer is nearly quantitative; and, since excess water is not present, there is no need for separate isolation and drying steps.

2 Claims, No Drawings

WATER-SOLUBLE GRAFT POLYMERS PRODUCED BY AN OUTWARDLY DRY RADIATION POLYMERIZATION PROCESS

BACKGROUND OF THE INVENTION

This invention relates to graft polymerization of water-soluble monomers and starch. More specifically, it relates to graft polymerization under conditions such that the reaction mixture appears dry.

Water-soluble polymers, such as those containing polyacrylamide, are useful as flocculants for removal of suspended solids from water and as additives in the manufacture of paper. If we consider polyacrylamide as a representative example, prior art methods of preparation utilize the following techniques [N. M. Bikales, Polymer Sci. Technol. 2: 213 (1973)]:

1. The polymerization is carried out in water solution using any of the common initiators known in the prior art, e.g., sodium bromate-sodium sulfite.
2. The polymerization is run in an aqueous solution which is dispersed in the form of small droplets in an organic medium such as toluene.
3. The polymerization is carried out in a reaction medium in which acrylamide monomer is soluble but the polymer is not. An example of such a medium is a 40–55 percent solution of t-butyl alcohol in water, preferably in the presence of a salt.

All of these methods require an isolation and drying step. This step is often the most difficult and expensive step in the preparation of polyacrylamide and other water-soluble polymers. Polymers prepared in water solution are particularly difficult to isolate due to the high viscosities which develop as the reaction progresses.

The grafting of polyacrylamide and other water-soluble polymers onto starch is well known in the prior art, and the resulting graft copolymers find use in the same applications as the respective starch-free homopolymers. Similar to homopolymers, starch graft copolymers prepared by prior art methods all require an isolation and drying step.

Irradiation with cobalt-60 is also a commonly used method of initiating graft polymerization onto starch. Two general methods are used for cobalt-60 initiated graft polymerization: the simultaneous irradiation technique and the preirradiation technique. In the simultaneous technique, starch, in either a water solution, water dispersion, or water slurry, is mixed with a water solution of monomer and the resulting slurry, dispersion, or solution is then irradiated. In the preirradiation technique, starch is irradiated in the dry state but in the complete absence of monomer. The irradiated starch, which contains long-lived free radicals, is then added to a water solution of monomer to initiate polymerization. In both techniques, the final reaction product is a slurry, dispersion, or solution in water which is often viscous and difficult to handle. These solutions must then be dewatered and the graft copolymer isolated and dried using procedures which are time consuming and expensive.

The preparation of conventional starch derivatives using techniques where the amount of water in the reaction mixture is minimized to give an outwardly dry blend is well known in the prior art. However, in these conventional starch derivatives, the substituents which are reacted with and added to the starch backbone are of low molecular weight, e.g., acetyl, benzoyl, carboxymethyl, or aminoalkyl. Consequently, the product of the reaction is a highly substituted starch containing many substituents of low molecular weight (often one or more substituents per AGU).

Starch graft copolymers are vastly different in chemical structure from conventional starch derivatives. In a starch graft copolymer, a water solution of monomer is polymerized to give substituents which are of high molecular weight (usually more than 100,000) and which are very infrequently spaced long the starch backbone (usually more than 500 AGU separating each polymeric substituent). A technique using an outwardly dry blend of starch, monomer, and water, which is similar to that used to prepare a conventional starch derivative would not be expected to give useful products if it were used to prepare a starch graft copolymer. Since the amount of water in the system would necessarily be minimized, to give the required outwardly dry blend, the concentration of polymerizable monomer in the water solution which is blended with starch would be high. Concentrated solutions of monomer in water are known to polymerize extremely rapidly with the evolution of much heat. Such polymerizations are commonly known as "runaway" polymerizations and generally give polymers which would be crosslinked and therefore show a reduced solubility in water and would thus be of limited utility.

For a thorough discussion on starch graft polymerizations see "Block and Graft Copolymerization," Vol. 1, ed. R. J. Ceresa, John Wiley and Sons, New York, 1973, Chapters 1 and 2.

DETAILED DESCRIPTION OF THE INVENTION

We have discovered a novel method of polymerizing acrylamide and other water-soluble monomers such as N,N,N-trimethylaminoethyl methacrylate methyl sulfate, methacrylamide, acrylic acid, 2-hydroxy-3-methacryloyloxypropyltrimethyl ammonium chloride, and other water-soluble monomers known in the prior art.

In this method, polymerization is carried out onto and within an outwardly dry starch matrix using the following sequence of steps:

a. Preparing a concentrated aqueous solution containing from about 20 to 50 percent of a water-soluble monomer.
b. Adding starch to the solution resulting from step (a) in sufficient quantity to absorb all of the monomer solution and to give a reaction mass having an outwardly dry or slightly damp appearance. The added starch was present in quantities such that the ratio of starch to monomer on a dry weight basis was from 1:1 to 20:1 which resulted in a monomer add-on of 6 to 17 percent.
c. Purging the starch-monomer mixture resulting from step (b) with nitrogen. And
d. Irradiating the purged mixture resulting from step (c) with gamma rays from cobalt-60 to a total dose of about 0.1 Mrad.

Since the reaction mass is in an outwardly dry, free-flowing form from start to finish and conversions are near quantitative, no further treatment is needed; and the product is ready for use immediately. The low radiation doses needed for quantitative conversion of monomer to polymer (ca. 0.1 Mrad) make this method ideally suited for a continuous process. The reaction product is mainly starch graft copolymer, although about 5–15 percent of the monomer is converted to ungrafted homopolymer.

Any polysaccharide may be used as the matrix for the polymerization. Starch is the matrix of choice for the following reasons:

1. It is low in cost.
2. It is water dispersible and thus will give a final product which is also dispersible in water. High dispersibility and solubility are of key importance if the product is to function as a flocculant or a retention aid.
3. It may be readily depolymerized (for example, by treatment with enzymes) without altering synthetic polymer segments which might be grafted to it. Polymers containing low amounts of starch may therefore be easily prepared by simple procedures.
4. Commercially available starches come in grades which vary greatly in water solubility. Final products having a degree of water solubility varying from cold-water-soluble to hot-water-dispersible are thus easily prepared by choosing the proper grade of starch for the polymerization matrix.

Although our polymerization method uses high concentrations of monomer in water, we were surprised to find that the molecular weight of synthetic polymer was relatively low. Thus, in addition to serving as the matrix for the outwardly dry polymerization reaction and as a site for grafting, granular starch also moderates the polymerization. This was less true for pasted starch, since much higher molecular weights were obtained. High molecular weight polymer is the expected reaction product at the concentrations used in our polymerizations, and the literature even reports the formation of polyacrylamide having a molecular weight so high as to render it water insoluble, when high-monomer concentrations were used with cobalt-60 initiation (A. Chapiro, "Radiation Chemistry of Polymeric Systems," Interscience Publishers, 1962, page 328).

Since it is known in the prior art that high molecular weight water-soluble polymers are better flocculating agents than those of lower molecular weight, the lower molecular weight synthetic polymers produced by our method might seem to constitute a disadvantage. This, however, is not the case. Starch is a high molecular weight polysaccharide and therefore yields a graft copolymer whose overall molecular size is sufficiently large to permit it to function as a flocculant.

The following examples are intended only to further illustrate the invention and are not to be construed as limiting the scope of the invention which is defined by the claims. All percentages and ratios disclosed herein are by weight unless otherwise specified.

EXAMPLE 1

A solution of 1.42 g. (0.005 mole) of N,N,N-trimethylaminoethyl methacrylate methyl sulfate and 6.75 g. (0.095 mole) of acrylamide in 10 ml. of water was prepared to give a total monomer concentration in water of 45% by weight. This solution was then added to 47.0 g. of unmodified wheat starch containing 14% water (40.6 g. of starch, dry basis), and the mixture was thoroughly blended with a spatula. Although the starch now contained 28.8% water, by weight, it was still a free-flowing powder. The mixture was evacuated to 50 mm. and repressured with nitrogen (this procedure was repeated four times). The mixture was then irradiated with gamma rays from cobalt-60 (dose rate of 1.15 Mrad/hour) to a total dose of 0.1 Mrad and was then allowed to stand at ambient temperature for 2 hours. The reaction mass was an outwardly dry powder which could be used immediately without any further treatment.

Ungrafted homopolymer was removed from the product by cold water extraction and the extracted product dried to yield 48.2 g. of graft copolymer containing 16 percent grafted synthetic polymer conversion of monomers to grafted polymer was 93 percent. Conversion to homopolymer was 7 percent. The graft copolymer was treated with enzyme to remove starch and the remaining synthetic polymer analyzed. The intrinsic viscosity in 1N sodium nitrate at 30°C. was 1.4 dl./g.; and $\overline{M}_n$ was 157,000 as determined by membrane osmometry.

EXAMPLE 2

A solution of 2.83 g. (0.01 mole) of N,N,N-trimethylaminoethyl methacrylate methyl sulfate and 13.5 g. (0.19 mole) of acrylamide in 20 ml. of water was prepared to give a total monomer concentration in water of 45 percent, by weight. To this solution was added 18.8 g. of unmodified wheat starch containing 13.7 percent water (16.2 g. of starch, dry basis). The mixture was stirred and heated to 64°C. to swell the starch granules and the resulting thick paste was allowed to stand at room temperature for 30 minutes. The mixture was then irradiated as in Example 1 to a total dose of 0.1 Mrad and allowed to stand at ambient temperature for 2 hours to yield a tough rubbery solid.

Ungrafted homopolymer was removed from the product by cold water extraction and the extracted product dried to yield 28.5 g. of graft copolymer containing 43 percent grafted synthetic polymer. Conversion of monomers to grafted polymer was 75 percent. Conversion to homopolymer was 15 percent. The graft copolymer was treated with enzyme to remove starch and the remaining synthetic polymer analyzed. The intrinsic viscosity in 1N sodium nitrate at 30°C. was 4.3 dl./g.

EXAMPLE 3

Example 1 was repeated with a commercially available starch which had been reduced in molecular weight to improve solubility (Stadex 60 dextrin). There was a minor difference in procedure from Example 1 in that N,N,N-trimethylaminoethyl methacrylate methyl sulfate was allowed to react for 1 hour in a 40 percent water solution with 0.052 ml. of dimethyl sulfate, to ensure that the monomer would be comletely in the quaternary ammonium form before polymerization. The conversion of monomers to polymer was quantitative, and the reaction mass was an outwardly dry powder which could be used immediately without any further treatment. The synthetic polymer content of the product was 17 percent.

EXAMPLE 4

A solution of 1.42 g. (0.005 mole) of N,N,N-trimethylaminoethyl methacrylate methyl sulfate and 6.75 g. (0.095 mole) of acrylamide in 18 ml. of water was prepared to give a total monomer concentration in water of 31.2 percent. N,N,N-Trimethylaminoethyl methacrylate methyl sulfate was allowed to react for 1 hour in a 40 percent water solution with 0.052 ml. of dimethyl sulfate, to ensure that the monomer would be completely in the quaternary ammonium form before polymerization. The solution of monomers in water was then added to 82.8 g. of a commercial modified corn starch of approximately 90 fluidity (Clinton 290B). The water content of the starch was 11.65 percent; the dry weight of starch was thus 73.2 g. The outwardly dry sample was irradiated under a nitrogen atmosphere as in Example 1 and allowed to stand at ambient temperature for 2 hours. The conversion of monomers to polymer was quantitative, and the reaction mass was an outwardly dry powder which could be used immediately without any further treatment. The synthetic polymer content of the product was 10 percent.

EXAMPLE 5

A solution of 7.1 g. of acrylamide (0.1 mole) in 10 ml. of water was prepared to give a monomer concentration in water of 41.5 percent. This solution was then added to 45.5 g. of Stadex 60 dextrin containing 10.8 percent water (40.6 g. of starch, dry basis), and the mixture thoroughly blended with a spatula. The free-flowing powder was irradiated with cobalt-60 under a nitrogen atmosphere, as in Example 1 to a total dose of 1 Mrad using a dose rate of 0.84 Mrad/hour. The conversion of monomer to polymer was quantitative, and the reaction mass was an outwardly dry powder which could be used without any further treatment. The graft copolymer was treated with enzyme to remove starch and the remaining synthetic polymer analyzed. The intrinsic viscosity in 1N sodium nitrate at 30° C. was 2.69 dl./g., corresponding to a calculated weight average molecular weight of 700,000.

EXAMPLE 6

A solution of 7.1 g. (0.1 mole) of acrylamide in 40 ml. of water was prepared to give a monomer concentration in water of 15.1 percent. This solution was then mixed with 8.9 g. of Stadex 60 containing 9.24 percent water (8.1 g. of starch, dry basis) and the mixture stirred and heated to 68° C. The resulting paste was cooled in ice for 30 minutes, irradiated with cobalt-60 (dose rate of 1.06 Mrad/hour) to a total dose of 0.1 Mrad, and allowed to stand at ambient temperature for 2 hours. The reaction mass was a thick paste. Conversion of monomer to polymer was 86 percent. The intrinsic viscosity of the polyacrylamide, after removal of starch with enzyme, was 3.8 dl./g. at 30° C. in 1N sodium nitrate. The calculated molecular weight was 1.18 × 10$^6$.

EXAMPLE 7

A solution of 14.2 g. (0.2 mole) of acrylamide in 20 ml. of water was prepared to give a monomer concentration of 41.5 percent, by weight. This solution was then mixed with 17.8 g. of Stadex 60 containing 9.24 percent water (16.2 g. of starch, dry basis). The mixture was heated to 68° C. on a steam bath, cooled in an ice bath for 30 minutes, irradiated as in Example 6, and allowed to stand at ambient temperature for 2 hours. The reaction mass was a tough, rubbery solid. Conversion of monomer to polymer was 97 percent. The intrinsic viscosity of the polyacrylamide, after removal of starch with enzyme was 5.7 dl./g. at 30° C. in 1N sodium nitrate. The calculated molecular weight was 2.18 × 10$^6$.

EXAMPLE 8

A solution of 14.2 g. (0.2 mole) of acrylamide in 20 ml. of water was prepared to give a monomer concentration in water of 41.5 percent, by weight. This solution was then treated in a manner identical to Example 7, but in the absence of starch. That is, the solution was heated to 68° C., cooled in an ice bath for 30 minutes, irradiated as in Example 6, and allowed to stand at ambient temperature for 2 hours. The reaction mass was a tough, rubbery solid; and the conversion of monomer to polymer was quantitative. The polymer was dewatered by treating the reaction mass with acetone and air drying to a water content of 15 percent. Polyacrylamide prepared by this technique in the absence of starch was only 18 percent soluble, as determined by stirring 0.5 g. of polymer in 375 ml. of water for 30 minutes in a boiling water bath, and would thus be totally useless as a flocculant or as a retention aid.

EXAMPLE 9

A partially neutralized acrylic acid solution of pH 4.8 was prepared by adding 9.5 ml. of 5M sodium hydroxide to 7.2 g. of glacial acrylic acid to give a monomer solution containing 46.6 percent solids by weight. This solution was then thoroughly blended with 46.4 g. (40.5 g., dry basis) of a commercially available acid-modified corn starch of approximately 40 fluidity (Clinton 240B). The water content of the starch was 12.8 percent. The resulting free-flowing powder was irradiated under nitrogen with cobalt-60 (dose rate of 0.88 Mrad/hour) to a total dose of 0.1 Mrad and was then allowed to stand at ambient temperature for 2 hours. The reaction product was an outwardly dry powder which could be used immediately without any further treatment. The conversion of monomer to polymer was quantitative, and the synthetic polymer content of the product was 17 percent.

EXAMPLE 9A

A partially neutralized acrylic acid solution of pH 4.8 was prepared by adding 3.5 ml. of 5M sodium hydroxide to 2.1 g. of glacial acrylic acid and then adding 6.5 ml. of water. The resulting monomer solution contained 19.3 percent solids, by weight. This solution was thoroughly blended with 44.8 g. (40.5 g., dry basis) of Stadex 60 having a water content of 9.6 percent. The resulting free-flowing powder was irradiated under nitrogen with cobalt-60 (dose rate of 0.92 Mrad/hour) to a total dose of 0.1 Mrad and was then allowed to stand at ambient temperature for 2 hours. The reaction product was an outwardly dry powder which could be used immediately without any further treatment. Conversion to polymer was quantitative, and the synthetic polymer content of the product was 6 percent.

EXAMPLE 10

A solution of 0.361 g. (0.005 mole) of glacial acrylic acid and 6.754 g. (0.095 mole) of acrylamide in 10 ml. of water was prepared to give a total monomer concentration in water of 41.5 percent. This solution was thoroughly blended with 45.7 g. (40.5 g., dry basis) of unmodified corn starch containing 11.5 percent water. The resulting free-flowing powder was irradiated under nitrogen (as in Example 1) with cobalt-60 (dose rate of 0.89 Mrad/hour) to a total dose of 0.1 Mrad and was then allowed to stand at ambient temperature for 2 hours. The reaction product was an outwardly dry powder which could be used immediately without any further treatment.

Ungrafted homopolymer was removed from the product by cold water extraction and the extracted product dried to yield 46.4 g. of graft copolymer. Conversion of monomers to grafted polymer was 83 percent. Conversion to homopolymer was 13 percent. The molecular weight of grafted synthetic polymer, after removal of starch by enzyme treatment, was 168,000, as determined by membrane osmometry.

EXAMPLE 11

A solution of 4.324 g. (0.06 mole) of glacial acrylic acid and 2.843 g. (0.04 mole) of acrylamide in 10 ml. of water was prepared to give a total monomer concentration in water of 41.7 percent. This solution was blended with unmodified corn starch and polymerized with cobalt-60 in the same manner as Example 10 to give a product similar in appearance.

Ungrafted homopolymer was removed by cold water extraction and the extracted product dried to yield 47.2 g. of graft copolymer. Conversion of monomers to grafted polymer was 92 percent.

Conversion to homopolymer was 8 percent. The molecular weight of grafted synthetic polymer, after removal of starch by enzyme treatment, ws 157,000, as determined by membrane osmometry.

EXAMPLE 12

A solution of 3.60 g. (0.05 mole) of glacial acrylic acid and 3.55 g. (0.05 mole) of acrylamide in 10 ml. of water was prepared. This solution was thoroughly blended with 43.6 g. (40.5 g., dry basis) of Stadex 60 dextrin. The resulting freeflowing powder was irradiated under nitrogen (as in Example 1) with cobalt-60 (dose rate of 1.13 Mrad/hour) to a total dose of 0.1 Mrad and was then allowed to stand at ambient temperature for 2 hours. Conversion of monomers to polymer was 92.3 percent, and the reaction product was an outwardly dry powder. The product contained 14 percent synthetic polymer.

EXAMPLE 13

In order to test the reaction product of Example 12 as a retention aid in the preparation of mineral-filled paper, a water solution was prepared by dispersing 0.486 g., dry basis, of the graft polymer in 375 ml. of water and then warming the dispersion to 60° C. The resulting clear solution was then diluted to a concentration of 200 mg. per liter.

Pulp furnish was a 50/50 blend of bleached softwood and bleached hardwood kraft containing 0.4 percent rosin, 2 percent alum, and 20 percent Huber HiWhite clay, based on the dry weight of pulp. Pulp furnish was prepared at a consistency of 2.5 percent and a pH of 5.6 and was diluted to 0.5 percent before use.

For laboratory retention tests, 600 ml. of pulp furnish (0.5 percent consistency) was placed in a 1-liter graduated cylinder and 25 ml. of polymer solution (200 mg./liter) added. The cylinder was inverted four times to assure good mixing and the contents filtered through a section of Fourdrinier wire. A 400-ml. portion of the filtrate was treated with 1 ml. of a 0.1 percent solution of Genfloc 155 to flocculate suspended solids, and the resulting mixture was filtered through tared Whatman 42 paper. The paper was dried and the weight of suspended solids determined. From the average of triplicate tests, suspended solids in the filtrate from the polymer-treated pulp furnish weighed 0.999 g., as compared with 0.235 g. for a control in which no polymer was added. This corresonds to a reduction in suspended solids of 58 percent from the control.

EXAMPLE 14

The reaction product of Example 12 was tested as a flocculant for silica (Celite) using a standard laboratory jar test apparatus. The graft polymer was dissolved by dispersing 0.5 g. of polymer in 375 ml. of water and heating the resulting dispersion to 90° C. in a boiling water bath. The resulting clear solution was diluted to a final concentration of 200 mg. per liter.

Polymer solution was added to a 3 percent suspension of Celite in tap water to give a final concentration of polymer of six parts per million and the resulting suspension stirred for 3 minutes at 100 r.p.m., 5 minutes at 50 r.p.m., and 1 hour at 20 r.p.m. After the mixture had settled for 15 minutes, the weight of suspended solids in 50 ml. of supernatant was 0.030 g., as compared with 1.25 for a control test in which no polymeric flocculant was added. Addition of polymer to a final concentration of 12 parts per million further reduced the suspended solids in 50 ml. of supernatant to 0.009 g.

EXAMPLE 14A

A solution of 3.55 g. of acrylamide and 3.60 g. of acrylic acid in 40 ml. of water was prepared and 8.7 g. (8.1 g., dry basis) of Stadex 60 was added. The mixture was stirred and heated on a steam bath to 68° C. and then cooled in ice water for 30 minutes. The mixture was irradiated with cobalt-60 (dose rate of 1.11 Mrad/hour) to a total dose of 0.1 Mrad and allowed to stand at ambient temperature for 2 hours. The thick, viscous paste was dewatered by blending with acetone and removing the solid by fitration. The solid polymer was then air dried to a water content of 10 percent. Conversion of monomers to polymer was 88 percent and the product contained 43.8 percent synthetic polymer, by weight.

EXAMPLE 14B

The product of Example 14A was tested as a retention aid using the method of Example 13, except that 15 ml. of the polymer solution (200 mg. per liter) was used in the test instead of 25 ml., due to the much larger amount of synthetic polymer in the product, as compared with the product of Example 12. Suspended solids in the filtrate from the polymer-treated pulp furnish weighed 0.098 g., as compared with 0.248 g. for a control in which no polymer was added. This corresponds to a reduction in suspended solids of 61 percent from the control.

EXAMPLE 15

The reaction product of Example 12 was tested as a flocculant for bentonite clay. A water solution of polymer, prepared as in Example 14, was added to 1 liter of a 0.5 percent suspension of bentonite clay in tap water in a graduated cylinder to give a final polymer concentration of 12 parts per million. The cylinder was inverted five times to assure thorough mixing and the suspension allowed to settle for 5 minutes. The percent transmission of the supernatant at 600 m$\mu$ was 94 percent, as compared with 12 percent for a control in which no polymeric flocculant was added.

EXAMPLE 15A

The reaction product of Example 14A was tested as a flocculant for bentonite clay in the same manner as Example 15, except that the suspension was allowed to settle for 10 minutes instead of 5 minutes. The percent transmission of the supernatant was 93 percent at 600 m$\mu$.

EXAMPLE 16

The product of Example 3 was dissolved in water and tested as a retention aid in the same manner as Example 13, except that 7.5 ml. of the polymer solution (200 mg. per liter) was used instead of 25 ml. Suspended solids in the filtrate from the polymer-treated pulp furnish weighed 0.100 g., as compared with 0.268 g. for a control in which no polymer was added. This corresponds to a reduction in suspended solids of 63 percent from the control.

EXAMPLE 17

The product of Example 3 was dispersed in water along with six times its weight of unmodified corn starch and was then used as a retention aid in the preparation of mineral-filled paper. A 32-inch Fourdrinier machine operating at 200 ft./minute was used, and the pulp furnish contained the same components as Example 13. Suspended solids in the white water were determined by filtering a known weight of white water through ashless Whatman 42 paper and then drying and weighing the paper. For determining filler retention, paper prepared on the Fourdrinier machine was ashed at 1098° K. for 1 hour.

The product of Example 3 functioned well as a retention aid, as shown by the following results.

| Addition level, %[a] | Suspended solids in white water, % | Filler content of manufactured paper, % |
|---|---|---|
| 0 (control) | 0.090 | 6.7 |
| 0.075 | 0.071 | 12.6 |
| 0.15 | 0.052 | 13.0 |
| 0.225 | 0.041 | 12.8 |
| 0.3 | 0.034 | 12.9 |

[a]Based on dry pulp furnish.

We claim:
1. A method of preparing starch graft copolymers comprising the steps of:
   a. preparing a concentrated aqueous solution containing from about 20 to 50 percent of a water-soluble monomer selected from the group consisting of acrylamide, N,N,N-trimethylaminoethyl methacrylate methyl sulfate, methacrylamide, acrylic acid, 2-hydroxy-3-methacryloyloxypropyltrimethylammonium chloride, or mixtures of the same;
   b. adding starch to the solution resulting from step (a) in sufficient quantities to absorb all of said solution and to give a reaction mass having an outwardly dry or slightly damp appearance, said starch being present in an amount such that the ratio of starch to monomer on a dry weight basis is from 1:1 to 20:1;
   c. purging the starch-monomer mixture resulting from step (b) with an inert gas; and
   d. irradiating the purged mixture resulting from step (c) with gamma rays from cobalt-60 to a total dose of about 0.1 Mrad.
2. A method as described in claim 1 wherein the reaction mass of step (b) contains from about 24 to 73 percent water.

* * * * *

PO-1050
(5/69)

UNITED STATES PATENT OFFICE
CERTIFICATE OF CORRECTION

Patent No. 3,976,552   Dated   August 24, 1976

Inventor(s)   George F. Fanta and Robert C. Burr

It is certified that error appears in the above-identified patent and that said Letters Patent are hereby corrected as shown below:

Column 7, line 65, delete "0.999" and insert -- 0.099 -- .

Signed and Sealed this

Twenty-third Day of November 1976

[SEAL]

Attest:

RUTH C. MASON
Attesting Officer

C. MARSHALL DANN
Commissioner of Patents and Trademarks